United States Patent
Bush et al.

(10) Patent No.: US 9,432,480 B2
(45) Date of Patent: Aug. 30, 2016

(54) MAGNETIC INDUCTION NETWORK DEVICE

(71) Applicant: Google Inc., Mountain View, CA (US)

(72) Inventors: Kathryn Bush, San Francisco, CA (US); Andrea Knight, Mountain View, CA (US)

(73) Assignee: Google Inc., Mountain View, CA (US)

( * ) Notice: Subject to any disclaimer, the term of this patent is extended or adjusted under 35 U.S.C. 154(b) by 493 days.

(21) Appl. No.: 13/956,527

(22) Filed: Aug. 1, 2013

(65) Prior Publication Data

US 2015/0046526 A1  Feb. 12, 2015

(51) Int. Cl.
*H04L 29/08* (2006.01)
*H02J 7/02* (2016.01)
*H02J 13/00* (2006.01)

(52) U.S. Cl.
CPC ............... *H04L 67/34* (2013.01); *H02J 7/025* (2013.01); *H02J 13/0079* (2013.01); *H02J 50/10* (2016.02); *H02J 50/40* (2016.02); *H04L 67/1095* (2013.01); *H04L 67/303* (2013.01)

(58) Field of Classification Search
CPC . H04L 67/1095; H04L 67/34; H04L 67/303; H02J 7/025
See application file for complete search history.

(56) References Cited

U.S. PATENT DOCUMENTS

| | | | |
|---|---|---|---|
| 2005/0127867 A1 | 6/2005 | Calhoon et al. | |
| 2008/0201658 A1 | 8/2008 | Saito et al. | |
| 2009/0048003 A1 | 2/2009 | Lu et al. | |
| 2010/0041333 A1* | 2/2010 | Ungari ................. | H02J 7/00 455/41.2 |
| 2010/0201310 A1 | 8/2010 | Vorenkamp et al. | |
| 2011/0248575 A1 | 10/2011 | Kim et al. | |
| 2013/0041531 A1 | 2/2013 | LaFrance | |
| 2013/0050973 A1 | 2/2013 | Rohrbach | |
| 2013/0110887 A1* | 5/2013 | Pan .................... | G06F 1/26 707/821 |

FOREIGN PATENT DOCUMENTS

| | | | |
|---|---|---|---|
| EP | 2056426 A2 | 5/2009 | |
| EP | 2533506 A1 | 12/2012 | |
| EP | 2546956 A2 | 1/2013 | |
| WO | WO-2012177283 A1 | 12/2012 | |

OTHER PUBLICATIONS

International Search Report and Written Opinion for PCT Application No. PCT/US2014/048223 dated Nov. 7, 2014.

* cited by examiner

*Primary Examiner* — Kim T Nguyen
(74) *Attorney, Agent, or Firm* — Honigman Miller Schwartz and Cohn LLP

(57) ABSTRACT

A network device has a housing, a magnetic induction charger, a wireless data link and a processor. The housing has one or more sides. The induction charger is housed by the housing and is arranged to wirelessly charge a rechargeable battery of a portable electronic device. The electronic device is adjacent to or in contact with the housing. The wireless data link communicates with the portable electronic device. The processor communicates with the magnetic induction charger and the wireless data link. In addition, the processor recognizes the portable electronic device and associates a profile with the portable electronic device. The processor delivers content to an associated media device based on the profile.

19 Claims, 9 Drawing Sheets

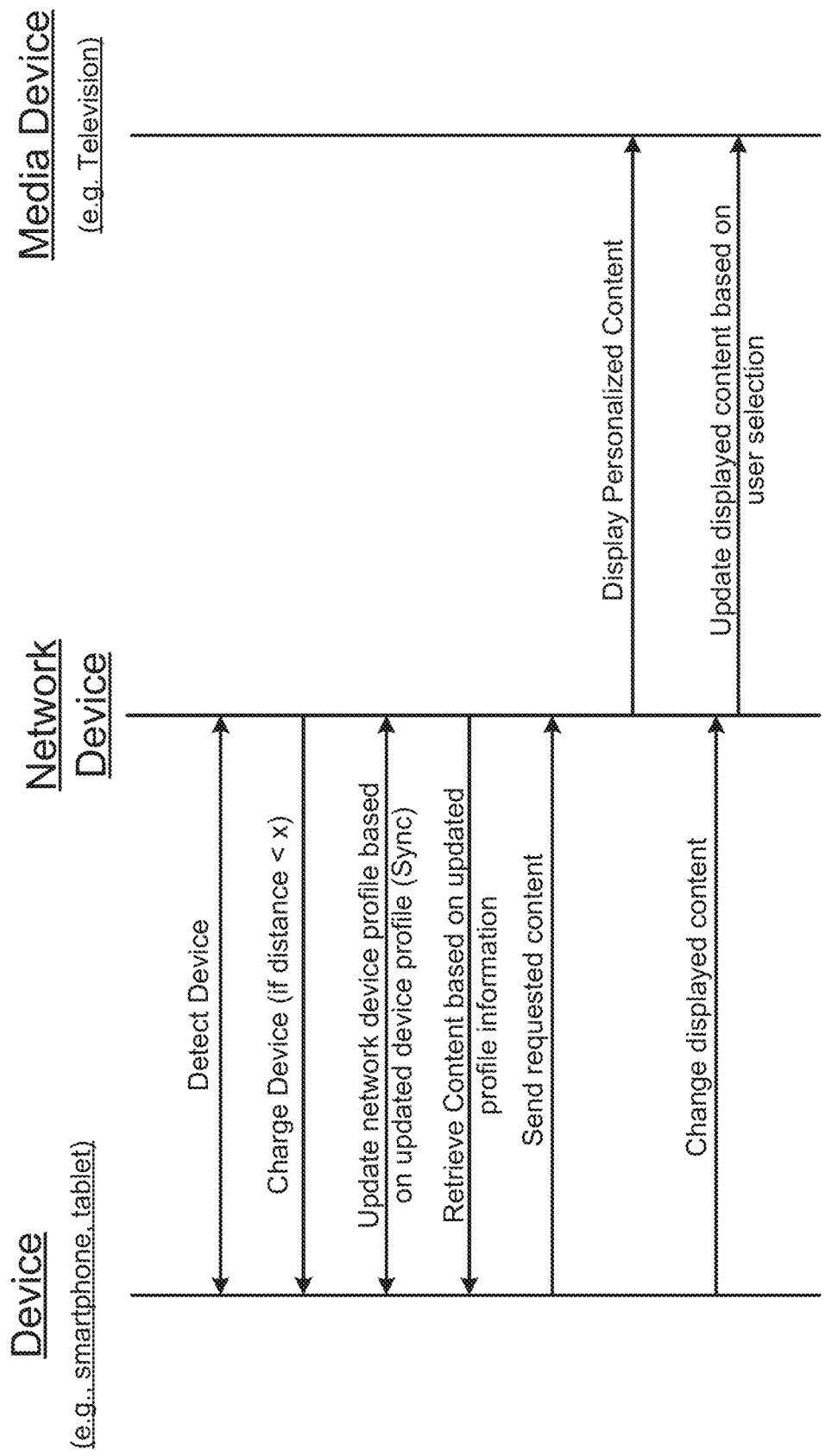

MAGNETIC INDUCTION NETWORK DEVICE

TECHNICAL FIELD

This disclosure relates to magnetic induction network devices.

BACKGROUND

Television is the prevalent global medium for entertainment and information despite the increase in use of smartphones and tablets throughout the past several years. A set-top box (STB) connects a television to an external source that provides a signal to the television. The STB usually contains a tuner for tuning the received signal and displaying the content (i.e., video, audio, internet web pages, interactive video gaming) on the television screen. The signal is usually received from a television service provider being, for example, one of a terrestrial (DTT), satellite, or cable provider. Traditionally, television service providers have offered limited user interaction with STBs. The interaction between the user and the STB is usually limited to a conventional remote controller that allows the user to change channels or select a program to watch from a program menu. Some STBs allow the user to record one or more programs to watch at a later time.

SUMMARY

One aspect of the disclosure provides a network device including a housing, a magnetic induction charger, a wireless data link, and a processor. The housing has one or more sides. The housing supports the induction charger, which is arranged to wirelessly charge a rechargeable battery of a portable electronic device. The portable electronic device is adjacent to or in contact with the housing. The wireless data link communicates with the portable electronic device. The processor communicates with the magnetic induction charger and the wireless data link, in addition, the processor recognizes the portable electronic device and associates a profile (e.g., a user profile) with the portable electronic device. The processor delivers content (e.g., relevant or personalized content) to an associated media device or devices (e.g., display or speakers) based on the profile (or synched user profile(s)).

Implementations of the disclosure may include one or more of the following features. In some implementations, the profile of the portable electronic device includes at least one of a user identifier, user preferences, user settings, or user favorites.

The processor may retrieve updated profile information from the portable electronic device and update the profile of the portable electronic device using the updated profile information. For example, the processor may receive profile information inputted into the portable electronic device by a user and then update an associated user profile stored remotely. Additionally, or alternatively, if the processor fails to retrieve an existing profile for the recognized portable electronic device, when associating a profile with the portable electronic device, the processor associates a default profile with the portable electronic device.

In some examples, the processor queries the portable electronic device for one or more media files stored in non-transitory memory of the portable electronic device. The processor then stores one or more media files of the portable electronic device in other non-transitory memory unassociated with the portable electronic device.

The processor may query an external networked storage device for a media purchase history associated with an owner of the portable electronic device. In some examples, the processor recognizes multiple portable electronic devices that are being charged by the magnetic induction charger or in communication with the wireless data link. The processor associates a profile with each recognized portable electronic device. For example, the processor may associate a default profile or 'historically recognized' profile with each portable electronic device communicating with or touching the surface of the magnetic induction charger. Additionally, the processor may deliver content to the associated media device based on weighted parameters of the profiles of all recognized portable electronic devices. The weighted parameters may include, but not limited to, at least one of an age, a movie genre, a music genre, favorite songs, favorite images, favorite videos, TV, movie, music or short-form video categorizations such as 'Genre', duration, favorites, age of users, Motion Picture Association of America (MPAA), star ratings, recommendations, preferred user interface settings, saved searches, consumption history, advertisement preferences, and/or social networks. In some implementations, the processor executes a party mode when a threshold number of portable electronic devices are charged by the magnetic induction charger or are in communication with the wireless data link. When in party mode, the processor delivers content to the media device(s) based on a time of day and a media history associated with each portable electronic device or a recommended or random selection of media associated with each portable electronic device.

In some implementations, the processor only recognizes and communicates with the portable electronic device, when the portable electronic device is adjacent to or in contact with the housing. If the portable electronic device is not in contact with the housing or not within a threshold distance, the processor may simply not be able to establish communication with the portable electronic device (e.g., hardware configuration) or may choose not to establish communication with the portable electronic device (e.g., software configuration) and may issue a message to move the portable electronic device closer or in contact with the housing.

Another aspect of the invention provides a communication method for communicating between a network device and a portable electronic device having a rechargeable battery. The method includes detecting a portable electronic device having a rechargeable battery and wirelessly charging the battery of the portable electronic device. Furthermore, the method includes establishing wireless data communications with the portable electronic device and associating a profile with the portable electronic device. Finally, the method includes delivering content to an associated media device based on the profile associated with the portable electronic device.

In some examples, the profile of the portable electronic device includes at least one of a user identifier, user preferences, user settings, or user favorites. The method may further include retrieving updated profile information from the portable electronic device and updating the profile of the portable electronic device using the updated profile information. If unable to retrieve an existing profile for the portable electronic device, the method may include associating a default profile with the portable electronic device.

The method may include querying the portable electronic device for one or more media files stored in non-transitory memory of the portable electronic device and storing in other non-transitory memory unassociated with the portable electronic device the one or more media files of the portable electronic device. Additionally or alternatively, the method further includes querying an external networked storage device for a media purchase history associated with an owner of the portable electronic device.

In some examples, when wirelessly charging or wirelessly communicating with multiple portable electronic devices, the method includes delivering content to the associated media devices based on weighted parameters of the profiles of all portable electronic devices. The weighted parameters may include at least one of an age, a movie genre, a music genre, favorite songs, favorite images, favorite videos, TV, movie, music or short-form video categorizations such as 'Genre', duration, favorites, age of users, Motion Picture Association of America (MPAA), star ratings, recommendations, preferred user interface settings, saved searches, consumption history, advertisement preferences, and/or social networks.

A party mode includes delivering content to the media device based on a time of day and a media history associated with each portable electronic device or a recommended or random selection of media associated with each portable electronic device (e.g., based on the recognized profiles of each portable electronic device). The method may include executing a party mode when wirelessly charging or wirelessly communicating with a threshold number of portable electronic devices.

The method may include only detecting and communicating with the portable electronic device, when the portable electronic device is within a threshold distance.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4B is a schematic view of the communication between an exemplary network device, a communication device, and a media device.

Like reference symbols in the various drawings indicate like elements.

DETAILED DESCRIPTION

Figure 1:
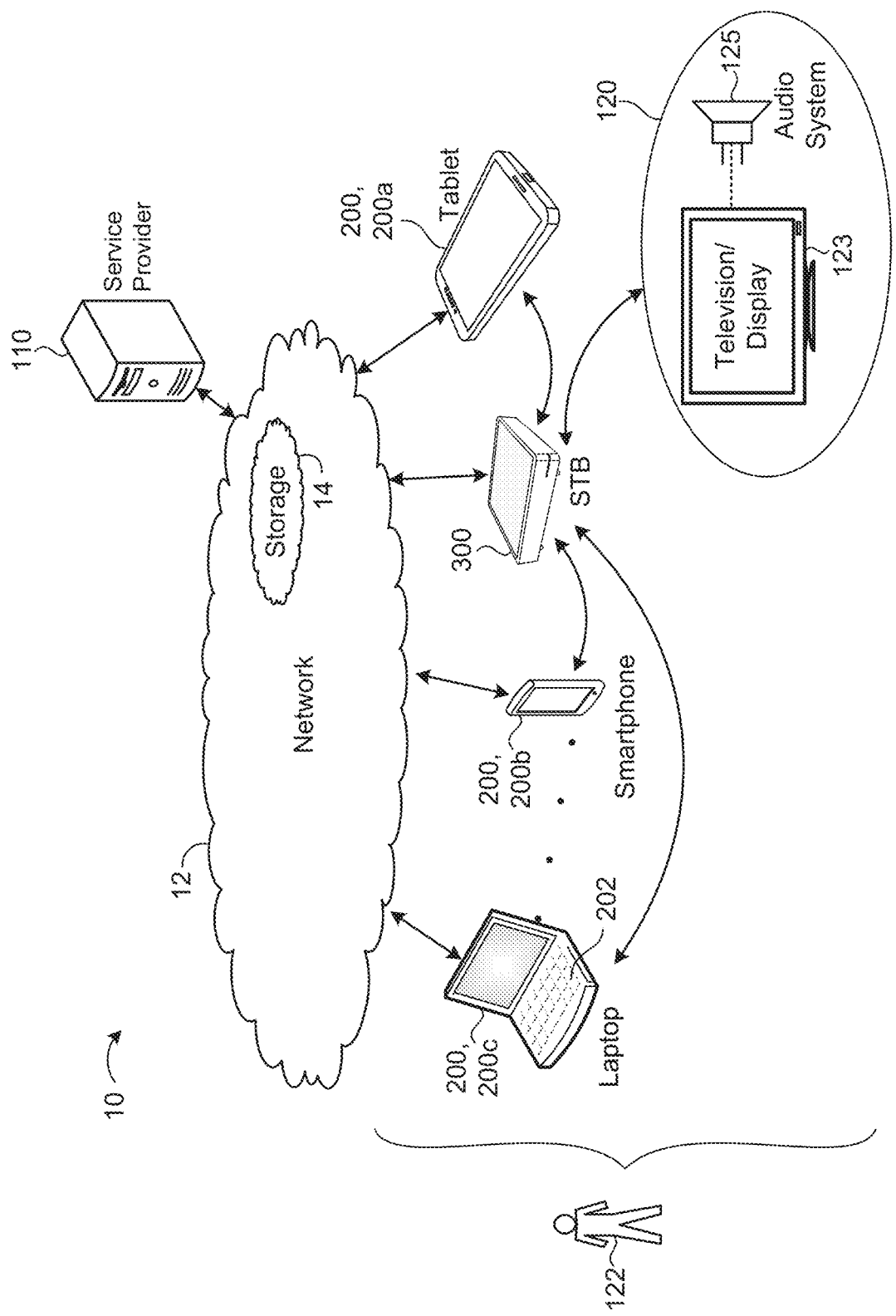
FIG. 1 is a schematic view of a system having an exemplary network device.
Figure 2A:
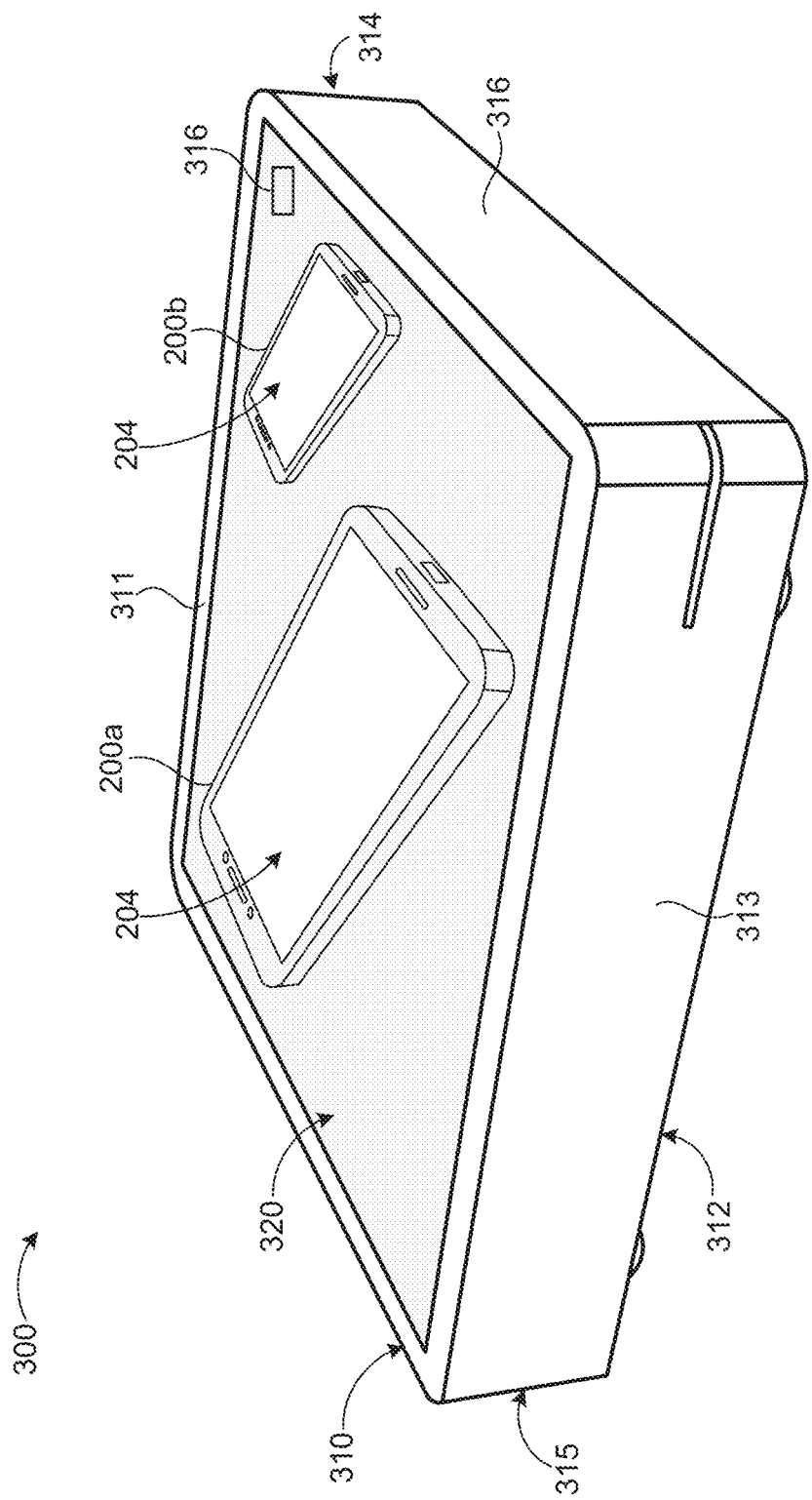
FIG. 2A is a schematic view of an exemplary network device.
Figure 2B:
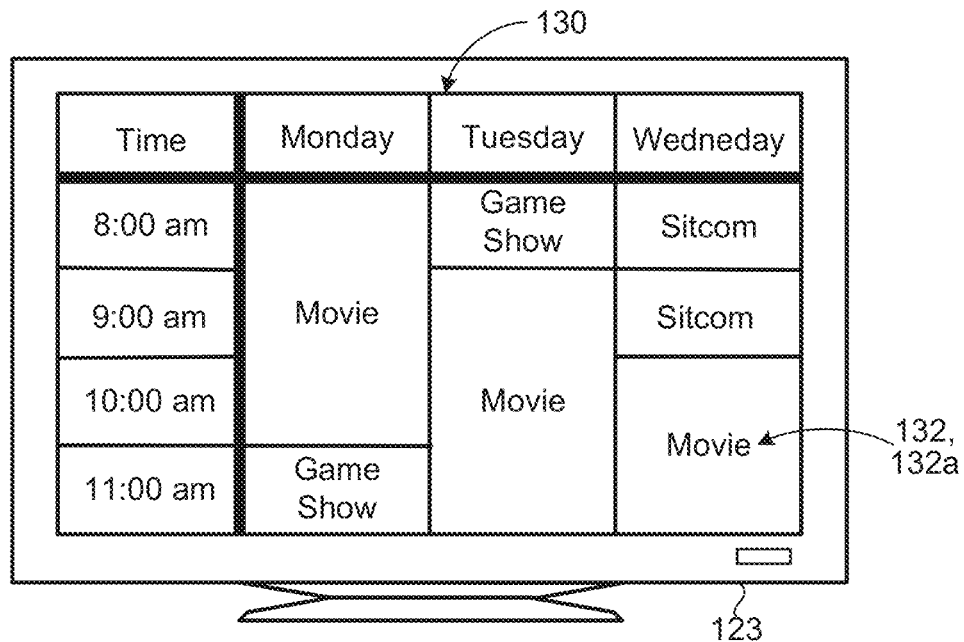
FIGS. 2B and 2C are schematic views of a display showing a program guide retrieved from a network device.
Figure 2C:
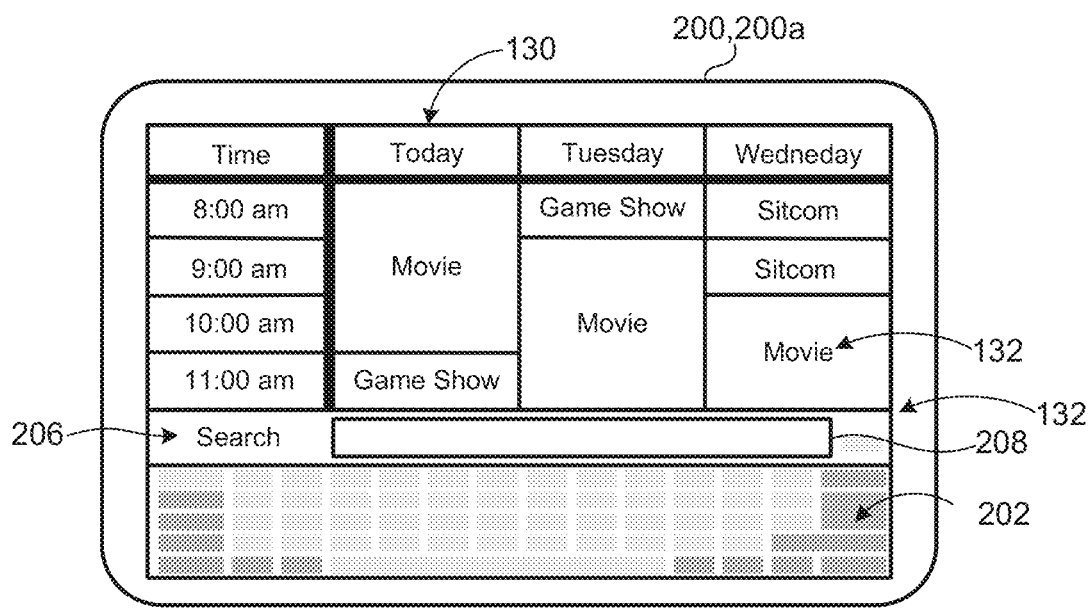
Figure 3:
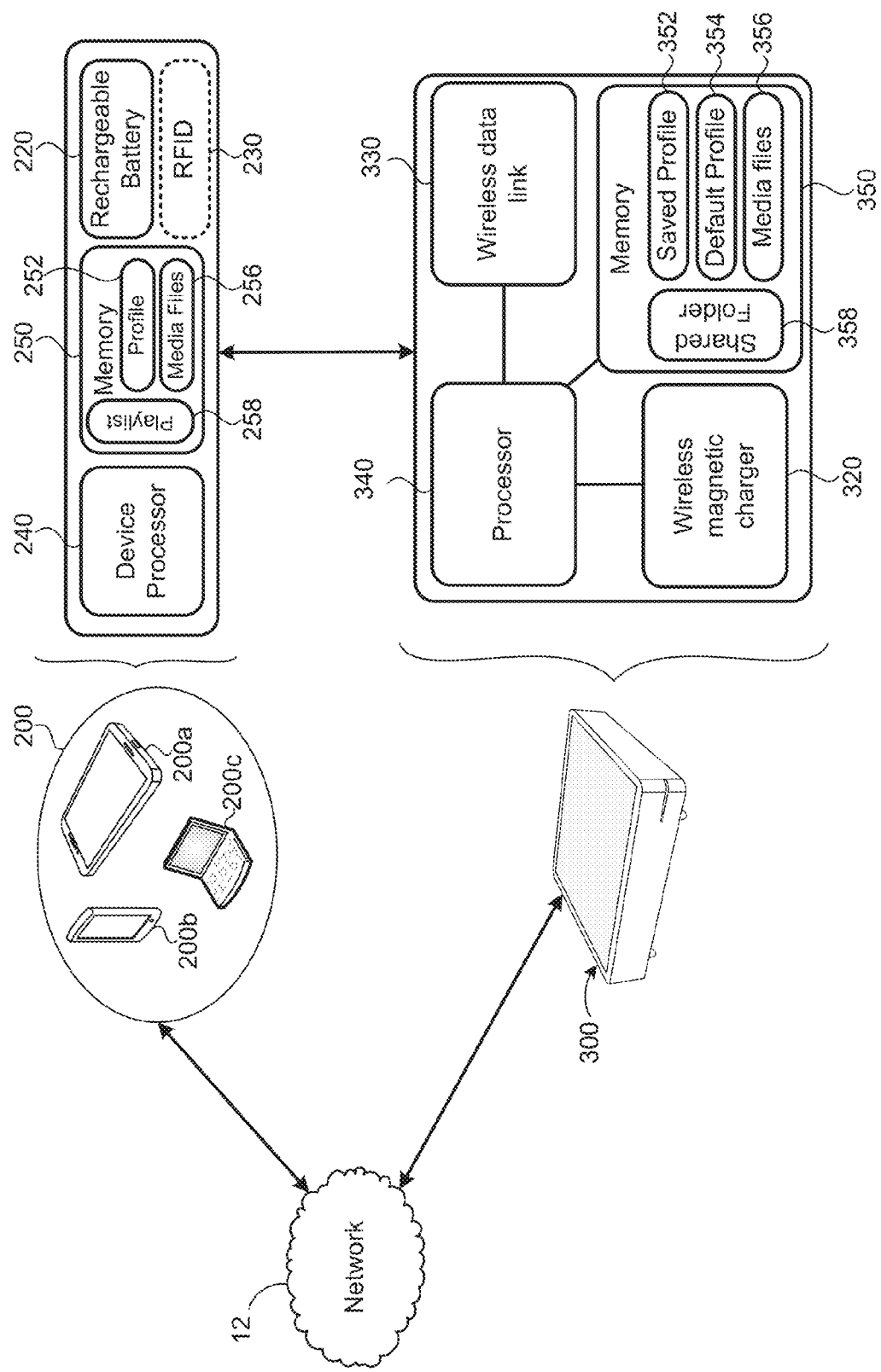
FIG. 3 is a schematic view of an exemplary network device and an exemplary receiver.

Referring to FIGS. 1-3, in some implementations, a system 10 of distributing television programs to subscribers 122 transmits signals from a cable television service provider 110 to a user 122 (e.g., via coaxial cables or fiber-optic cables). A receiver 300 (e.g., TV, DVR, Storage, STB, or Network box) receives the television signal to allow viewing of corresponding television programming. The user 122 may operate a remote control (e.g., a traditional remote control or an associated mobile device-based application) to control the receiver 300. The receiver 300 may display a program guide 130 on a display device 123 (e.g., television or projection screen). The program guide 130 may include information relating to the name 132a of a program 132 (e.g., shows, sitcoms, movies, and music), the time of the show, and an overview of the program 132. The user 122 may control what the receiver 300 outputs to the television display 120 by selecting, via the program guide 130, what the user 122 wants to watch or listen to. Other features/operations that the user 122 may perform on the receiver 300 include changing channels, browsing a program guide 130 (e.g., searching for content), selecting a program 132 from the program guide 130 to watch, or set a scheduled recording for a specific program 132.

In some implementations, the user 122 may also view the program guide 130 using a portable electronic device 200, such as a tablet 200a, a smartphone 200b, or a personal computer 200c (e.g., a portable computer, a wearable computer or a desktop computer). The user 122 may have similar program guide 130 search functionality on the portable electronic device 200 as on the display device 123. Therefore, the user 122 may browse through the program guide 130 on the portable electronic device 200 and search for specific programs 132 to record. Due to a keyboard 202 (e.g., non-touchscreen or touchscreen keyboard) associated with a portable electronic device 200, a user 122 may find it easier to search the program guide 130 using the portable electronic device 200. When the user 122 selects a program 132 to watch from the program guide 130 on the portable electronic device 200, the user 122 may watch the program 132 on the display device 123 or on the portable electronic device 200. In some examples, the user 122 may start watching a television program 132 on the display device 123 and continue to watch the television program 132 on another display such as a tablet 200a, the smartphone 200b, and/or a personal portable computer 200c (e.g., laptop).

In some examples, the receiver 300 is a network device connected to other devices through a network 12. A portable electronic device 200, such as a tablet 200a, a smartphone 200b, or a laptop 200c, may be used as a secondary remote to control the network device 300 and the programs 132 (e.g., shows, sitcoms, movies, and music channel) that are displayed on the display device 123. The use of the portable electronic device 200 significantly enhances the experience of the display device 123 by providing the user 122 with multiple features, such as a faster search functionality 206 (e.g. through the program guide 130 or through recorded programs), enhanced content information, faster browsing, personalized advertising experiences, and better personal media upload. The enhanced features are due to the ease of use of the portable electronic device 200, specifically the use of the keyboard 202 associated with a portable electronic device 200. In addition, the portable electronic device 200 provides the user 122 with an enhanced experience due to the interactive touch screen 204 of the tablet 200a. For example, if a user 122 wants to search for a program 132 using a conventional television remote control, the user 122 has to go to a menu by pressing a button on the remote, then the user 122 uses the number buttons (each representing a number and in some cases letters) located on the remote control to select the letters that make up the name 132a of the program 132. Such a task is time consuming and mundane. The portable electronic device 200 facilitates the searching features available to the user 122, because the user 122 may type the name 132a of the program 132 in a search box 208 instead of entering each letter through a number keypad.

The network 12 may include any type of network that allows sending and receiving communication signals (e.g., as a wireless telecommunication network, a cellular telephone network, a time division multiple access (TDMA) network, a code division multiple access (CDMA) network, a global system for mobile communications (GSM), a third generation (3G) network, a fourth generation (4G) network, a satellite communications network, and other communication networks). The network may include one or more of a Wide Area Network (WAN), a Local Area Network (LAN), and a Personal Area Network (PAN). In some examples, the network includes a combination of data networks and telecommunication networks. The distribution system 10 includes both wireless and wired communications. The communication between the portable electronic device 200 and the network device 300 is usually wireless and the communication between the display device 123 and the network device 300 is usually wired.

Referring to FIG. 2, the network device 300 includes a housing 310. The housing 310 is constructed by a top portion 311, a bottom portion 312, a front portion 313, a back portion 314, a right portion 315, and a left portion 316. The housing 310 protects the components (e.g., electrical components) located within the network device 300. In some examples, the housing 310 includes a power supply (not shown) for providing power to the network device 300.

Many users 122 regularly use multiple portable electronic devices 200 (e.g., tablet 200a, smartphone 200b, and/or personal computer 200c) in tandem, each requiring a different cable for charging the batteries of the portable electronic devices 200. In addition, each household may have multiple users 122, where each user 122 has multiple portable electronic devices 200. Therefore, a user 122 may be overwhelmed with the number of chargers and cable connections that need to be made when charging all his portable electronic devices 200. The network device 300 includes a magnetic induction charger 320 for universally charging portable electronic devices 200 and eliminating the need for individual docking stations and separate cords used for each portable electronic device 200. The magnetic induction charger 320 de-clutters a charging area by eliminating cables and saves a user 122 time, since the user 122 does not have to manually connect the portable electronic device 200 to a charger. The magnetic induction charger 320 requires a user 122 to place a portable electronic device 200 having a rechargeable battery 220 near the network device 300 and the network device 300 may charge the portable electronic device 200. The magnetic induction charger 320 housed by the housing 310 is arranged to wirelessly charge a rechargeable battery 220 of a portable electronic device 200 adjacent to or in contact with the housing 310. In some examples, the magnetic induction charger 320 is disposed on one or more of the sides 310-316 of the housing 310 of the network device 300. The magnetic induction charger 320 uses an electromagnetic field to transfer energy between the network device 300 (i.e., the charging station) and the portable electronic device 200 being charged. In some examples, the magnetic induction charger 320 includes an induction coil 317 for creating an alternating electromagnetic field within the network device 300. On the receiving end, the charging portable electronic device 200 includes an induction coil 317 which takes the power from the electromagnetic field and converts it into electrical current for charging the rechargeable battery 220 of the portable electronic device 200. One or more of the sides 310-316 of the housing 310 of the network device 300 may emit colored light (e.g., via a light emitter, color changing surface material, etc.) to indicate when the portable electronic device 200 is charging, has fully charged, and/or has synched personalized content. For example, the side surface 310-316 nearest or in contact with the portable electronic device 200 may emit/illuminate a lighted line around the perimeter of the portable electronic device 200, where the color of line indicates a status of the portable electronic device 200 (e.g., charging, charged, synched, etc.).

Referring to FIG. 3, the network device 300 includes a wireless data link 330 that allows for communication between the network device 300 and the portable electronic devices 200 and/or between the multiple portable electronic devices 200 of a household. The network device 300 also includes a processor 340 that communicates with the magnetic induction charger 320 and the wireless data link 330. The processor 340 recognizes a portable electronic device 200 and associates a profile 352 with the portable electronic device 200. For example, the processor may receive an identifier of the portable electronic device 200, query a data store of profiles 352, and retrieve the profile 352 for association with the portable electronic device 200. The processor 340 delivers content to an associated media device 120 based on the profile 352. The profile 352 of the portable electronic device 200 includes at least one of a user identifier, user preferences, user settings, or user favorites. The network device 300 allows users 122 to charge a portable electronic device 200 that may be used to control the media device 120 or any other portable electronic device 200 by placing the portable electronic device 200 adjacent to or in contact with the housing 310 of the network device 300. In addition, the network device 300 communicates with the portable electronic device 200 being charged and may automatically synchronize contents, functionality, or user interface preferences, or automatically update software based on the user's 122 predetermined synchronization setting stored in the saved profile 352 associated with the portable electronic device 200. The network device 300 may also update software and content on portable electronic devices 200 previously connected to the network device 300.

Figure 4A:
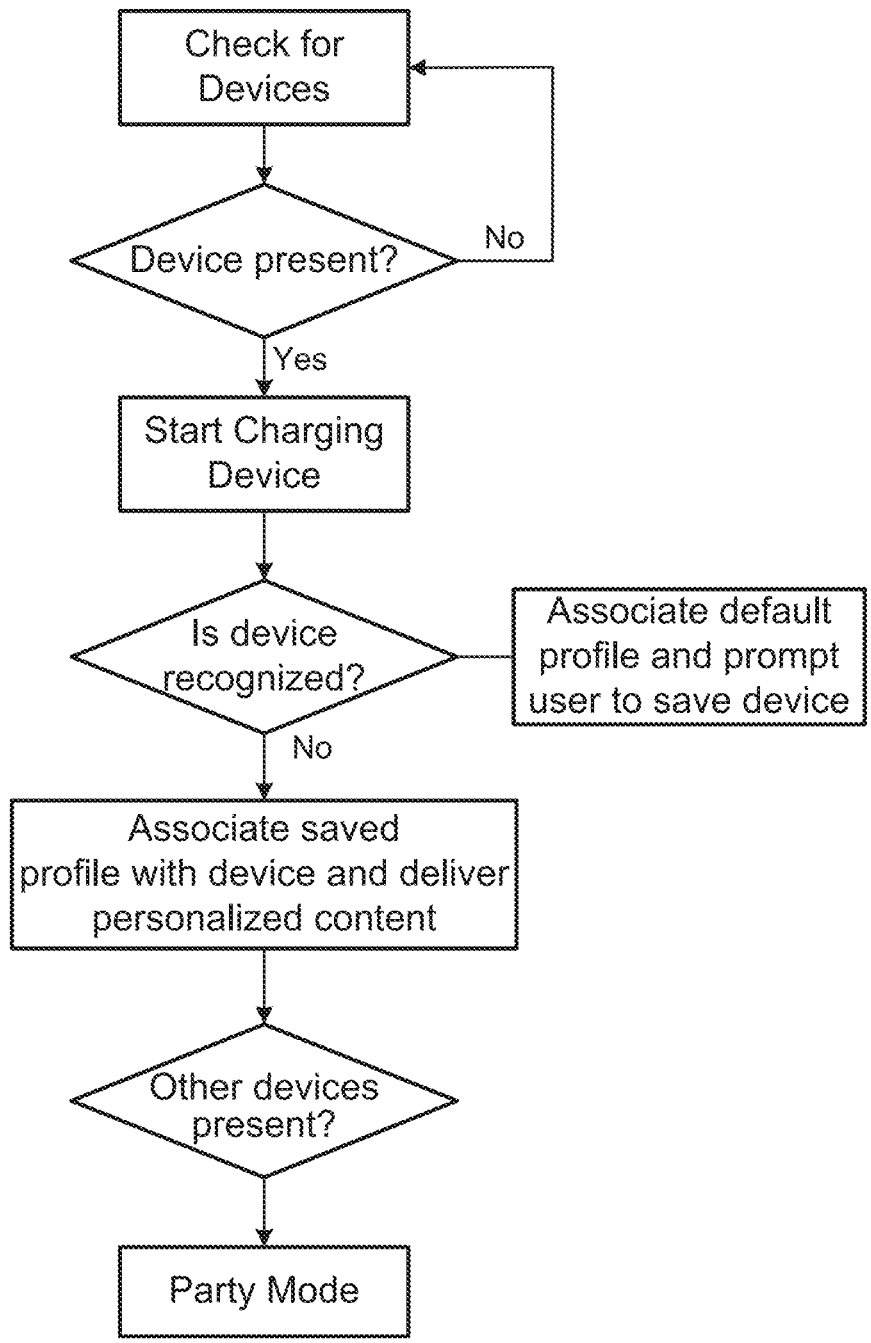
FIG. 4A is a block diagram of the behavior of an exemplary network device.

Referring to FIGS. 4A and 4B, when the network device 300 is turned on, the processor 340 checks for portable electronic devices 200 that are adjacent to or in contact with the housing 310. Adjacent may refer to a portable electronic device 200 within the same room of the network device 300 or within the same house of the network device 300. The user may also explicitly set parameters for proximity/distance. The portable electronic device 200 may allow for one time (2-way) 'permissions' for devices to accept/deny being in range (e.g., implementing a BlueTooth protocol) as a safeguard against malicious pairings.

Adjacent may be a threshold distance set based on hardware capabilities. If the processor 340 does not detect a portable electronic device 200 adjacent to or in contact with the housing 310, the processor 340 keeps searching for a portable electronic device 200. However, if the processor 340 detects a portable electronic device 200 adjacent to or in contact with the housing 310, then the network device 300 will start charging the detected portable electronic device 200, and then the network device 300 keeps looking for other devices 200 that the network device 300 may also charge.

Once charging of the portable electronic device 200 is initiated, the processor 340 tries to recognize if the portable electronic device 200 has a saved profile 352 stored in a memory 350 of the network device 300. If so, the processor 340 associates the saved profile 352 with the portable electronic device 200. If the portable electronic device 200 is not recognized, the network device 300 associates a default profile 354 to the portable electronic device 200. In some examples, the network device 300 prompts the user 122 to create a personalized profile 352 associated with the unrecognized portable electronic device 200 to improve the content the network device 300 provides to the user 122. If the user 122 accepts the personalized profile 352 that the network device 300 has associated with the portable electronic device 200, the network device 300 may ask the user 122 to access information and media files 256 located on the portable electronic device 200. The network device 300 may also ask for the user 122 to specify what media files 256 to sync with other devices 200 or with the network device 300 when the network device 300 detects the portable electronic device 200. The user 122 may control the files, folder, stored programs, or any other content, stored on the memory 250 (e.g., non-transitory memory, flash memory, dynamic random access memory (DRAM), phase change memory (PCM), and/or disks) of the device, that he/she wants to share or synchronize with other network devices 300 or other portable electronic devices 200. For example, the user 122 may have two or more portable electronic devices 200 that may be synchronized when the user 122 places them adjacent to or in contact with the housing 310 of the network device 300.

In some examples, the processor 340 retrieves updated profile information 252 from the portable electronic device 200. The processor 340 updates the device profile 352 stored in a memory 350 (e.g., non-transitory memory, flash memory, dynamic random access memory (DRAM), phase change memory (PCM), and/or disks) of the network device 300 based on the updated profile information 252 retrieved from the portable electronic device 200. As discussed above, when the processor 340 does not find a saved profile 352 in the memory 350, the processor 340 may associate a default profile 254 with the portable electronic device 200. In addition, the processor 340 may fail to retrieve an existing saved profile 352 saved in the memory 350 of the network device 300 that is associated with the portable electronic device 200 due to a communication error or any other error. In such situations, the processor 340 may associate a default profile 354 with the portable electronic device 200.

Figure 5:
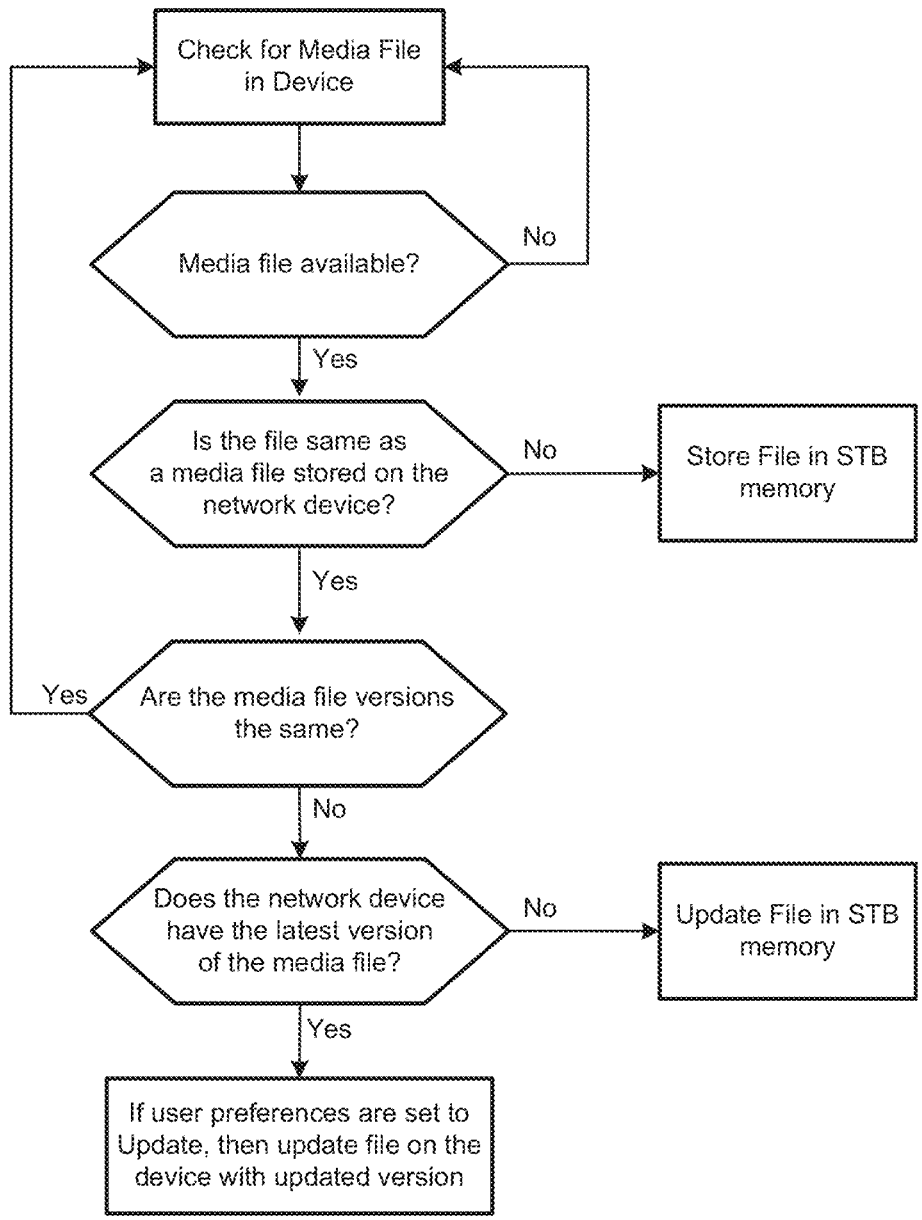
FIG. 5 is a block diagram of the behavior of an exemplary network device as it checks for updated media files with other portable electronic devices.

Referring to FIG. 5, in some implementations, the processor 340 queries the portable electronic devices 200 for media files 256 (e.g., images, audio, and video stored on the device memory 250. The processor 340 checks whether the media files 256 are also stored in the memory 352 of the network device 300. If the media files 256, 356 are stored in the memory 352 of the network device 300, the processor 340 checks which version of the media file 256, 356 is the latest version. If the media files 256, 356 have the same version, the processor 340 carries on to check the next media file 256 stored on the portable electronic device 200. If however one of the media files 256, 356 is a newer version, the processor 340 either stores the media file 256 to the memory 350 of the network device 300, if the electronic device 200 has the latest version of the media files 256, or the processor 340 sends a command to the device processor 240 indicating that a newer version of the media file 356 is available for retrieval from the memory 350. The device processor 240 may then store the media file 356 located on the memory 350 of the network device 300 in the memory 250 of the portable electronic device 200.

In some implementations, a user 122 has more than one portable electronic device 200 and may purchase content, such as media files 256 on one portable electronic device 200. When the portable electronic device 200 having the newly purchased media files 256 is either being charged and/or is adjacent to or in contact with the housing 310 of the network device 300, the processor 340 queries the portable electronic device 200 or any other external networked storage device (e.g., network storage 14, or other storage devices) for a media purchase history associated with the user 122 who made the purchase on the portable electronic device 200. The processor 340 may then transfer the purchase history along with the purchased media files 256 to other portable electronic devices 200 or to the network device 300 while complying with copyright laws and any digital rights management requirements. For example, the transfer may only occur between devices owned by the same user and the media file 256 cannot simultaneously be played on more than one device. In other examples, the media file 256 is temporarily shared and has a time-out provisioned with its playing.

In some examples, the user 122 may schedule a recording of a program 132 via the network device 300. The network device 300 records the scheduled program 132 and stores it in the memory 350. When the network device 300 detects a portable electronic device 200, the processor 340 of the network device 300 may transfer the recorded program 132 to the detected portable electronic device 200.

Figure 6A:
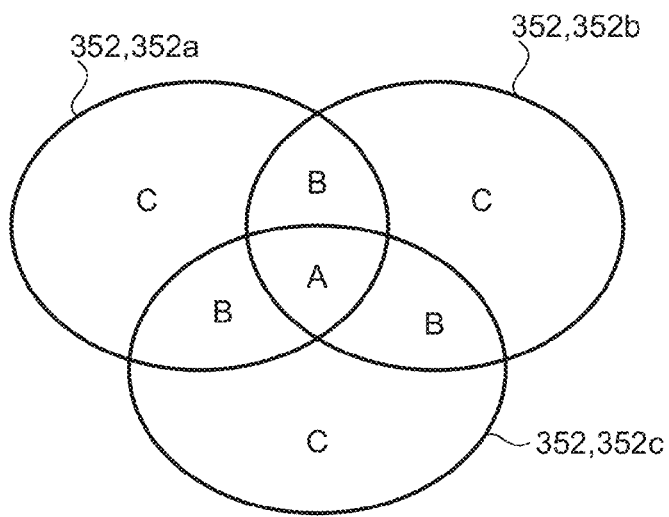
FIGS. 6A and 6B are schematic views of Venn diagrams showing the party mode playlists.
Figure 6B:
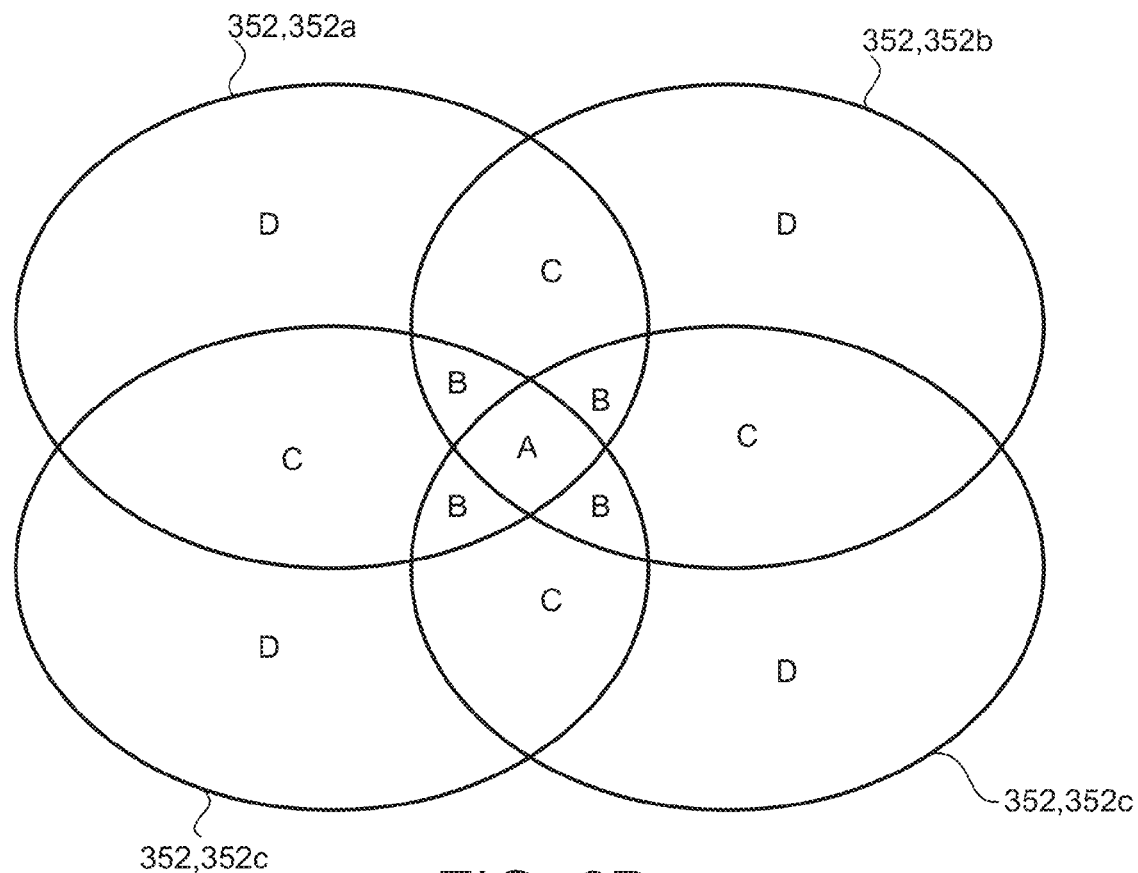

In some examples, multiple portable electronic devices 200 may be charged by the magnetic induction charger 320 and/or in communication with the wireless data link 330. The processor 340 may recognize these multiple portable electronic devices 200 and associate a profile 352 (e.g., saved profile 352 when the device has been previously identified or a default profile 354 if the device has not been previously identified) with each of the portable electronic devices 200 detected. The processor 340 considers the profile 352 of all the connected portable electronic devices 200 and delivers content to the associated media device 120 (e.g., television 123 or audio device 125) based on weighted parameters of the profiles 352 of all the recognized portable electronic devices 200. The weighted parameters may include, in addition to the profile information, one or more of an age, a movie genre, a music genre, favorite songs, favorite images, favorite videos, TV, movie, music or short-form video categorizations such as 'Genre', duration, favorites, age of users, Motion Picture Association of America (MPAA), star ratings, recommendations, preferred user interface settings, saved searches, consumption history, advertisement preferences, and/or social networks. The processor 340 may execute a party mode when a threshold number of portable electronic devices 200 are being charged by the wireless magnetic charger 320 and/or in communication with the wireless data link 330. The processor 340 delivers content to the media device 120 based on a time of day and a media history associated with each portable electronic device 200 or a random selection of media associated with each portable electronic device 200. When the network device 300 is in party mode, the processor 340 finds group recommendations based on all the recognized portable electronic devices 200 adjacent to or in contact with the housing 310 of the network device 300. Referring to FIG. 6A, if the network device 300 detects three portable electronic devices 200, each having a user profile 352a, 352b, and 352c, the processor 340 considers the weighted parameters and other information to determine the commonality between the three profiles 352. The processor 340 prioritizes the content to be played based on the content having the most commonality between the three profiles 352. The content having the first priority is content A, because it has parameters common between the three profiles 352. The content having the second priority is content B because the content shares parameters with two out of the three profiles 352. Lastly, content C has the lowest priority because it has parameters that are not shared amongst the profiles 352. FIG. 6B provides a similar concept having four different profiles 352, with content D having the least priority. Therefore, after determining the priority of the contents associated with each portable electronic device 200, the processor 340 determines what content may be displayed by the display device 123 that is of interest to all the users 122.

In some examples, the processor 340 may track the trends that occur when certain portable electronic devices 200 are connected. For example, if a household of four watches a specific program 132 or listens to a specific genre of music every so often at a specific time, the network device 300 learns such a trend and makes recommendations of similar programs 132 or music that might be of interest to the members of the household.

In some examples, the portable electronic device 200 receives voice calls or video calls. The processor 340 may execute a phone mode that allows the user 122 to answer the call (either voice call or video call) through the display device 123. The display device 123 may include a microphone and a video camera for allowing the user 122 to video chat using the bigger display device 123 rather than the smaller portable electronic device 200 display.

Therefore, once a portable electronic device 200 is detected (e.g., placed on the surface of the network device 300), the network device 300 detects the presence of the user 122 in the vicinity of the network device 300 and initiates charging of the rechargeable battery 220, and one or more of a software, content, advertisement, geo personalization either based on the preferences stored in the user profile or by a user request.

In some examples, a user 122 creates a music or a video playlist 258 on his portable electronic device 200. The user 122 may then place his portable electronic device 200 adjacent to or near the network device 300, or anywhere adjacent to or in contact with the housing 310 of the network device 300. The content of the created playlist may be transferred from one portable electronic device 200 to the other and subsequently displayed on the media device 120. In some examples, the processor 340 selects specific attributes (e.g., genre) from the playlist associated with the user 122 and stores such attributes as part of the profile 352 associated with the portable electronic device 200. The processor 340 considers the saved attributes when making suggestion of other media files 356 to be added to the playlist. In some examples, the user 122 may manually select what media files to be transferred to the network device 300 instead of transferring the playlist in its entirety.

A friend mode allows friends to share personal media files 256 (e.g., songs, pictures, videos). The friend mode allows users 122 to store specific media files 256 stored on their respective portable electronic devices 200 in a shared folder 358 on the memory 350 of the network device 300 (e.g., while complying with copyright laws and any digital rights management requirements). A first user 122 may save a media file on the shared folder 358. A second user 122 having a different portable electronic device 200 may browse the shared folder 358 and download all or specific media files 356 stored in the shared folder 358. In some examples, the second user 122 may select the media files 356 to download to his respective portable electronic device 200 by using his portable electronic device 200 or by using the media device 120, which receives a command from the user 122 to select which media files to download.

The network device 300 may also provide advertisements based on the portable electronic devices 200 detected. In some implementations, the processor 340 determines the location of the portable electronic device 200 based on the geolocation of the portable electronic device 200. In addition, the processor 340 may retrieve locations that the user 122 has traveled to during the day before connecting his portable electronic device 200 to the network device 300, and based on the locations provide specific advertisements to the user 122 while the user 122 is watching a program 132 or navigating through the program guide 130 on the display device 123 or on the portable electronic device 200. The processor 340 may consider the profile 352 of the detected portable electronic device 200 and based on that profile 356 provides advertisements. For examples, if the user 122 of the portable electronic device 200 detected is a single young professional, the network device 300 may provide advertisements geared to young professionals. In some implementations, if the household has younger children, the network device 300 does not provide advertisements that are inappropriate for children within a specific time of the day. In some implementations, the network device 300 determines the applications installed on the portable electronic devices 200. Based on the type of applications downloaded on the portable electronic device 200, the network device 300 provides specific advertisements to the media device 120.

In some examples, a radio-frequency identification (RFID) 230 chip associated with the network device 300 may be placed on a portable electronic device 200. The REID chip 230 is a wireless non-contact chip used for identification and tracking of objects. The RFID 230 uses radio-frequency electromagnetic fields to transfer identification data. The network device 300 may identify portable electronic devices 200 that have an RFID chip 230 associated with them.

Figure 7:
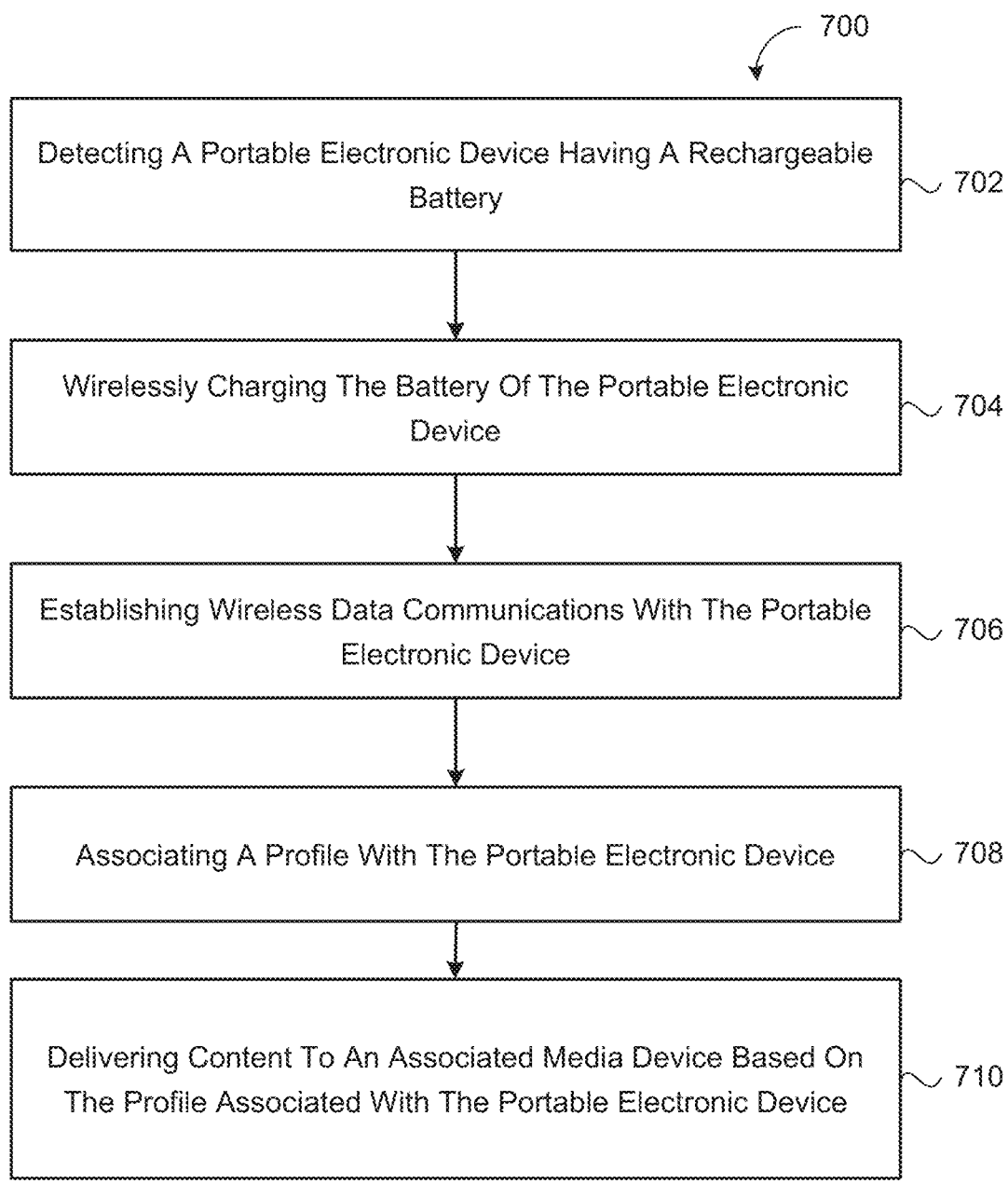
FIG. 7 is a schematic view of an exemplary arrangement of operations for a method of communicating between a network device and a portable electronic device having a rechargeable battery.

FIG. 7 provides an exemplary arrangement of operations for a method 700 for communicating between a network device 300 (e.g., TV/DVR/STB/Storage box) and a portable electronic device 200 having a rechargeable battery 220. The method 700 includes detecting 702 the portable electronic device 200 having the rechargeable battery 220 and wirelessly charging 704 the battery 220 of the portable electronic device 200. Furthermore, the method 700 includes establishing 706 wireless data communications with the portable electronic device 200 and associating 708 a profile 352 with the portable electronic device 200. Finally, the method 700 includes delivering 710 content to an associated media device (e.g., display device 123 or audio device 125) based on the profile 352 associated with the portable electronic device 200. The profile 352 associated with the device 200 is stored in the memory 350 of the network device 300.

In some examples, the profile 352 of the portable electronic device 200 includes at least one of a user identifier, user preferences, user settings, user favorites, or user consumption/purchase patterns. The method 700 may further include retrieving updated profile 252 information from the portable electronic device 200 and updating the profile 352 of the portable electronic device 200 stored on the memory 350 of the network device 300 using the updated profile information 252 from the portable electronic device 200. If unable to retrieve an existing saved profile 352 from the memory 350 of the network device 300 for the portable electronic device 200, the method 700 may include associating a default profile 354 (as previously discussed) with the portable electronic device 200.

The method 700 may include querying the portable electronic device 200 for media files stored in the memory 250 of the portable electronic device 200 and storing in other non-transitory memory unassociated with the portable electronic device (e.g., the network device or other portable electronic devices) one or more media files 256 of the portable electronic device 200. Additionally or alternatively, the method 700 further includes querying an external networked storage device (e.g., portable electronic device or storage found on the network 12) for a media purchase history associated with a user 122 of the portable electronic device 200.

In some examples, when wirelessly charging or wirelessly communicating with multiple portable electronic devices 200, the method 700 includes delivering content to the associated media devices 120 based on weighted parameters of the profiles of all portable electronic devices 200. The weighted parameters may include at least one of an age, a movie genre, a music genre, favorite songs, favorite images, favorite videos, etc. A party mode includes delivering content to the media device 120 based on a time of day and a media history associated with each portable electronic device 200 or a random selection of media associated with each portable electronic device 200. The method 700 may include executing a party mode when wirelessly charging or wirelessly communicating with a threshold number of portable electronic devices 200. The processor 340 prioritizes the content to be displayed on the media device 120 based on the discussion with reference to FIGS. 6A and 6B. In some examples, the method 700 includes tracking trends that occur when specific portable electronic devices 200 are connected to the network device 300 together. Based on the trends, the method 700 includes displaying specific content on the display device 123.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, non-transitory memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a non-transitory memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computing device having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A network device comprising:
   a housing having one or more sides;
   a magnetic induction charger supported by the housing and arranged to wirelessly charge a rechargeable battery of a portable electronic device adjacent to or in contact with the housing;
   a wireless data link communicating with the portable electronic device; and
   a processor in communication with the magnetic induction charger and the wireless data link, the processor configured to:
      recognize multiple portable electronic devices for charging by the magnetic induction charger or for communication with the wireless data link;
      associate a profile with each portable electronic device;
      deliver content to an associated media device based on at least one profile; and
      when a number of recognized portable electronic devices satisfies a threshold, execute a party mode that delivers content to the media device based on a time of day and a media history associated with each portable electronic device or a random selection of media associated with each portable electronic device.

2. The network device of claim 1, wherein the profile of each corresponding portable electronic device comprises at least one of a user identifier, user preferences, user settings, or user favorites.

3. The network device of claim 1, wherein the processor:
   retrieves updated profile information from each corresponding portable electronic device; and
   updates the profile of the corresponding portable electronic device using the corresponding updated profile information.

4. The network device of claim 1, wherein when the processor fails to retrieve an existing profile for any recognized portable electronic device, when associating the profile with the corresponding portable electronic device, the processor is configured to associate a default profile with the corresponding portable electronic device.

5. The network device of claim 1, wherein the processor:
   queries the portable electronic devices for one or more media files stored in non-transitory memory of the portable electronic devices; and
   stores the one or more media files of the portable electronic devices in other non-transitory memory unassociated with the portable electronic devices.

6. The network device of claim 1, wherein the processor queries an external networked storage device for a media purchase history associated with an owner of at least one portable electronic device.

7. The network device of claim 1, wherein the processor is further configured to deliver the content to the associated media device based on weighted parameters of the profiles of the recognized portable electronic devices.

8. The network device of claim 7, wherein the weighted parameters comprise at least one of an age, a movie genre, a music genre, favorite songs, favorite images, or favorite videos.

9. The network device of claim 1, wherein the processor is configured to only recognize and communicate with the portable electronic devices, when the portable electronic devices are adjacent to or in contact with the housing.

10. A communication method comprising:
    detecting, by data processing hardware, multiple portable electronic devices, at least one portable electronic device having a rechargeable battery;
    wirelessly charging, by an induction charger in communication with the data processing hardware, the battery of the at least one portable electronic device;
    establishing, by a wireless data link wireless in communication with the data processing hardware, data communications with the detected portable electronic devices;
    associating, by the data processing hardware, a profile with each portable electronic device;
    delivering, by the data processing hardware, content to an associated media device based on the profile associated with one or more corresponding portable electronic devices; and
    when a number of detected portable electronic devices satisfies a threshold, executing, by the data processing hardware, a party mode that delivers content to the media device based on a time of day and a media history associated with each portable electronic device or a random selection of media associated with each portable electronic device.

11. The method of claim 10, wherein the profile of each corresponding device comprises at least one of a user identifier, user preferences, user settings, or user favorites.

12. The method of claim 10, further comprising:
    retrieving updated profile information from each corresponding portable electronic device; and
    updating the profile of the corresponding portable electronic device using the corresponding updated profile information.

13. The method of claim 10, further comprising, when unable to retrieve an existing profile for any portable electronic device, associating, by the data processing hardware, a default profile with the corresponding portable electronic device.

14. The method of claim 10, further comprising:
    querying the portable electronic devices for one or more media files stored in non-transitory memory of the portable electronic devices; and
    storing in other non-transitory memory unassociated with the portable electronic device the one or more media files of the portable electronic devices.

15. The method of claim 10, further comprising querying, by the data processing hardware, an external networked storage device for a media purchase history associated with an owner of at least one portable electronic device.

16. The method of claim 10, further comprising, when wirelessly charging or wirelessly communicating with multiple portable electronic devices, delivering content to the media device based on weighted parameters of the profiles of the portable electronic devices.

17. The method of claim 16, wherein the weighted parameters comprise at least one of an age, a movie genre, a music genre, favorite songs, favorite images, or favorite videos.

18. The method of claim 10, further comprising, when wirelessly charging or wirelessly communicating with multiple portable electronic devices, sharing media files between the portable electronic devices.

19. The method of claim 10, further comprising only detecting and communicating with any portable electronic device, when the portable electronic device is within a threshold distance.

* * * * *